United States Patent [19]

Taillet

[11] Patent Number: 4,736,906
[45] Date of Patent: Apr. 12, 1988

[54] METHOD AND APPARATUS FOR CANCELLING THE ELECTROSTATIC POTENTIAL OF A HELICOPTER RELATIVE TO GROUND POTENTIAL

[75] Inventor: Joseph Taillet, Boulogne, France

[73] Assignee: Office National d'Etudes et de Recherches Aerospatiales, Chatillon, France

[21] Appl. No.: 734,474

[22] Filed: May 15, 1985

[30] Foreign Application Priority Data

May 16, 1984 [FR] France ............................. 84 07607

[51] Int. Cl.$^4$ ............................................. B64D 45/02
[52] U.S. Cl. .................................. 244/1 A; 244/17.11; 361/218
[58] Field of Search ................... 244/1 A, 17.11, 121; 361/212, 217, 218; 324/72, 72.5, 457

[56] References Cited

U.S. PATENT DOCUMENTS

| | | | |
|---|---|---|---|
| 3,260,893 | 7/1966 | De la Cienva et al. | 361/218 |
| 3,600,632 | 8/1971 | Bright et al. | 361/218 |
| 3,846,700 | 11/1974 | Sasaki et al. | 324/72 |
| 3,857,066 | 12/1974 | Cline et al. | 361/218 |
| 3,874,616 | 4/1975 | Buser et al. | 244/17.11 |
| 4,059,846 | 11/1977 | Eisenhauer | 361/218 |
| 4,101,825 | 7/1978 | Truax | 324/72 |

FOREIGN PATENT DOCUMENTS 2025145 9/1970 France .

*Primary Examiner*—Joseph F. Peters, Jr.
*Assistant Examiner*—Rodney Corl
*Attorney, Agent, or Firm*—Kane, Dalsimer, Sullivan, Kurucz, Levy, Eisele & Richard

[57] ABSTRACT

A rescuer (1) is lowered at the end of cable (2) from a helicopter having a winch (4) on which the cable is wound. The rescuer is provided with a electric field sensor (20) which is downwardly directed and which is connected to a radio transmitter (22). The helicopter (3) has a corresponding radio receiver (24) which serves to actuate an active static discharger which is servo-controlled to the electrical magnitude supplied by the sensor (20). The servo-control is such that the potential difference between the rescuer (11) and the person to be rescued (10) is progressively reduced as the rescuer approaches the person to be rescued. Practically all risks of an electric shock on making contact are thus avoided.

15 Claims, 3 Drawing Sheets

METHOD AND APPARATUS FOR CANCELLING THE ELECTROSTATIC POTENTIAL OF A HELICOPTER RELATIVE TO GROUND POTENTIAL

FIELD OF THE INVENTION

During helicopter flight, and in particular when hovering over the sea, over arid terrain, or over a snow field, the surface of a helicopter, and more particularly of its rotating blades, is subjected to the impact of dust, spray, or particles of ice which serve to electrostatically charge the vehicle. This electric charge is always a nuisance, and it becomes a major impediment to certain applications such as rescue operations since an electrostatically charged helicopter gives rise to a potential difference between the rescuer and the person being rescued of as much as several hundreds of kilovolts.

Rescues may take place anywhere on the surface of the globe, i.e. at sea, on a cliff base, or in mountainous terrain. In order to perform such a rescue, the helicopter is provided with apparatus which essentially comprises a winch having a cable wound thereon. The rescuer is attached by a harness to the end of the cable which is generally made of metal, for strength reasons. The winch is operated to pay out the cable and to lower the rescuer towards the person being rescued. The rescuer then passes a second harness around the body of the person being rescued and the winch is operated a second time to wind in the cable and raise both the rescuer and the person being rescued into the helicopter.

Although standing instructions require the end of the metal cable to be put into contact with the sea or the earth in order to discharge the static electricity on the helicopter to ground prior to making contact with the person being rescued, this maneuver is not always possible under the atmospheric conditions or the terrain actually encountered. The cable and its load may be swinging, or waves or irregular terrain may prevent adequate contact. Further, the use of a second cable or conductive wire between the helicopter and the surface below is to be avoided at all costs for safety reasons: there is a danger of the extra cable being caught up by the wind and becoming tangled with the rotor, which could lead to a serious accident. Under such conditions, it can happen that the rescuer and the person being rescued are subjected to an extremely violent electrical shock just prior to making contact with each other due to the vehicle discharging to ground through the bodies of the two people concerned. This situation arises frequently for helicopter crews concerned with rescue operations, with transporting emergency medical cases, and with supplying offshore installations in the North Sea.

BACKGROUND OF THE INVENTION

Efforts have therefore been made to electrically discharge helicopters using servo-controlled devices intended to keep the electrical potential of the helicopter at zero volts. Presently available devices for performing this function are not entirely satisfactory.

A major difficulty encountered when designing such a device is measuring the actual potential of the helicopter. For the reasons mentioned above, this measurement must be performed without making contact with the ground (if it is possible to make such contact, there is no need to make a measurement since the contact can be used to discharge the helicopter potential). The electrical field is therefore measured using a field measuring device, e.g. of the windmill type, mounted on the structure of the helicopter.

However, the technical literature on the subject shows that measurements made in this way are spoiled by an unacceptable degree of error whenever the space surrounding the vehicle includes electrically charged particles in suspension. Unfortunately, this is always the case when a helicopter is flying under conditions which tend to give its structure an electrostatic charge. The air may be filled with spray, or sand, or an aerosol of highly charged ice particles. Under these conditions, inputting the error-corrupted measurement to the servo-control system for discharging the helicopter not only has the effect of limiting the minimum potential achievable to not less than about 100 kilovolts, but may also, under some circumstances, actually increase the potential of the helicopter.

That is why proposals have recently appeared in the technical literature which aim at keeping track of the electric charge in the space around the helicopter by calculation in order to determine the potential of the helicopter. The space charge is assumed to be uniform; its value is determined from a sample which may be taken, for example, by means of a suitable sensor; and a microcomputer onboard the helicopter determines the value of the helicopter potential on the basis of the measurement performed by the windmill sensors and by the space charge probe. A device of this type is described in an article by O. TRANBARGER and B. M. DUFF in International Aerospace and Ground Conference on Lightning and Static Electricity, 31, pages 1-34, 21-23 June 1983, Fort Worth, Tex., USA.

This technique is far from perfect since there is no reason for the space charge to be distributed uniformly in the turbulent flow of air round the vehicle. Consequently it appears to be impossible for this method to reduce the potential of the helicopter below a few tens of kilovolts. It may also be observed that this method is cumbersome in that it requires accurate measurement of space charge and the provision of a microcomputer.

Thus, in the present state of the art, and when the sea is rough, it is impossible to perform a rescue at sea by helicopter without exposing both the rescuer and the person being rescued to a dangerous electric shock. More generally, the same is true of rescue operations over land. More generally still, the residual potential may interfere with many types of lifting operation performed by helicopters.

The aim of the invention is to solve this problem by making it possible to reduce the potential difference between the helicopter and ground to a few volts, thereby practically completely eliminating any risk of an electric shock.

SUMMARY OF THE INVENTION

The method proposed is a method of the type in which a load is suspended at the end of a conductive cable which is electrically connected to the chassis of the helicopter and which is lowered towards the surface of the ground. According to a general feature of the invention a measurement is performed at the load of an electrical magnitude which is proportional to the potential difference between the load and the ground, and preferably the electric field established in the vicinity of the load between the load and the ground. An active system for losing charge from the helicopter-cable-load system is then operated as a function of the said electrical magnitude and in such a direction as to tend to reduce the potential difference between the helicopter and the ground, thereby practically eliminating the potential difference when the load reaches the ground surfaces. The successful operation of this method may be explained by the following remarks which relate, more specifically, to the context a helicopter rescue operation:

The entire potential to be eliminated between the helicopter and the ground exists between the rescuer and the person being rescued, indeed this is the root cause of the danger to be avoided. As the rescuer is lowered towards the person to be rescued, there is less and less electric charge in the space between them. This is true even if the charge density per unit volume in the space between them does not decrease as they move closer together, since the volume in question (and consequently the total charge therein) is also reduced as they move closer together. The potential of the helicopter is thus measured much more accurately by measuring the electric field between the rescuer and the ground or between the rescuer and the person being rescued than when it is performed at the helicopter itself.

As the distance between the rescuer and the person being rescued is reduced, the electric field caused by a given potential difference between them increases. Thus, as the danger of a spark increases, the sensitivity of the electric field measurement also increases, thereby facilitating elimination of the potential by the means responsive to the measurement; and the more necessary such elimination becomes the easier it becomes. The limit on the accuracy of such elimination, i.e. the residual potential of the helicopter, results from the fact that there is always a contact potential difference of a few volts between the sensitive surface of the measuring apparatus carried by the rescuer and the facing surface of the body or clothing of the person being rescued. This potential difference is 1000 to 10,000 times smaller than the potential difference which can be obtained by the best means described in the literature, which is a considerable improvement.

The present invention also provides apparatus for performing the above-described method from a helicopter fitted with a winch having a conductive cable wound thereon which cable is electrically connected to the helicopter chassis and supports a load such as a rescuer to be lowered towards the ground. In accordance with the invention, the load is provided with an electric field sensor facing the ground surface; an active static discharger is provided for the helicopter-cable-load system, and means are provided for servo-controlling the discharger as a function of the detected electric field in such a direction as to tend to reduce said field, thereby eliminating the potential difference between the load and the ground surface as they approach each other.

The active static discharger may be provided on-board the helicopter, in which case a link is provided for transmitting the electrical magnitude (the electric field) from the load or rescuer to the helicopter.

In a variant, the active static discharger is provided at the load and is directed away from the point being aimed at on the ground surface. I.e., the rescuer attempts to approach the person being rescued from one side and to discharge static from the side facing away from the person being rescued, but still in the general direction of the ground surface.

BRIEF DESCRIPTION OF THE DRAWINGS

An implementation of the invention is described by way of example with reference to the accompanying drawings, in which.

MORE DETAILED DESCRIPTION

Figure 1:
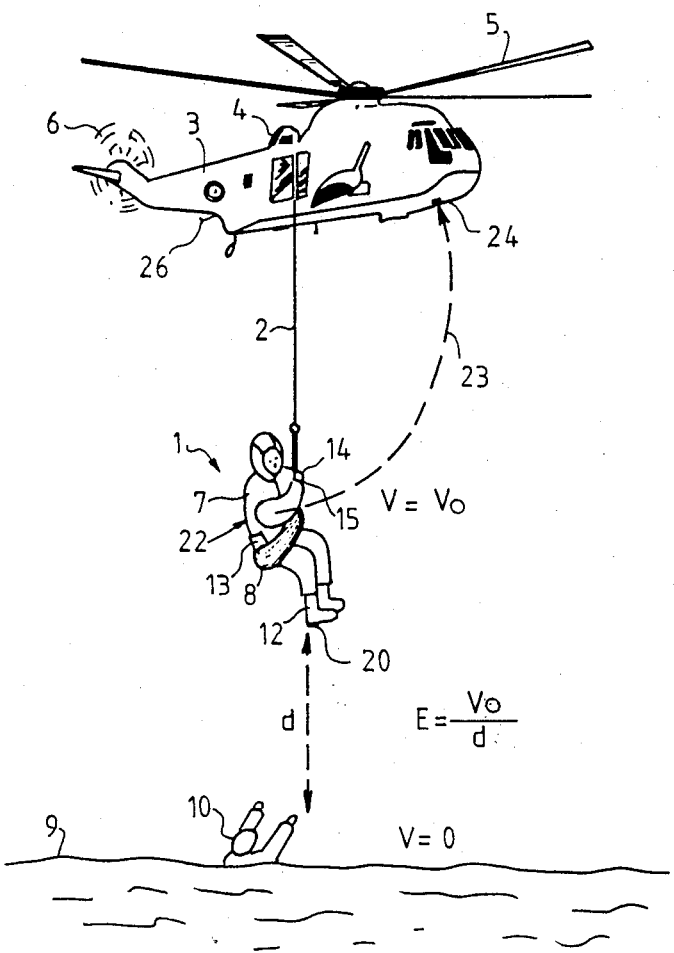
FIG. 1 is a diagram showing apparatus in accordance with the invention for use in a helicopter rescue.

In FIG. 1, a rescuer 1 is suspended by a harness 8 from the end of a cable 2 which is wound on a winch 4 on board a helicopter 3. The helicopter's main rotor 5 and tail rotor 6 are visible in the figure. The rescuer is wearing special clothing comprising a suit 7, boots 12, and gloves 14. the rescuer is lowered towards the person to be rescued 10 who is shipwrecked at sea 9, and who may be on board a small boat or raft (not shown).

Figure 2:
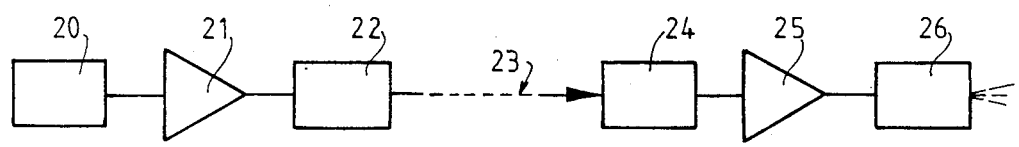
FIG. 2 is a block diagram showing the principle of electrical operation of the FIG. 1 apparatus.

Reference is now made to FIGS. 1 and 2. An electric field sensor 20 is fitted, for example, to one of the rescuer's boots 12. The sensor is associated with an amplifier 21 and is connected to a radio transmitter 22 which may be located in one of the rescuer's pockets 13. This equipment is powered by a small battery. The radio link 23 leads to a radio receiver 24 mounted on the helicopter and connected via a suitable amplifier 25 to an active static discharger 26. The ground terminal of the sensor 20 is connected to the cable 2 which is in turn electrically connected to the structure or electrical ground of the helicopter.

The potential of the helicopter-cable-rescuer assembly is noted $V = V_0$. The ground surface 9 is taken as the reference potential, i.e. $V = 0$. At any given instant, the distance between the rescuer 1 and the person being rescued 10 is noted d. The electric field between the rescuer and the person being rescued is thus $E = V_0/d$ (insofar as this field is uniform).

While the rescuer is still at some distance from the person being rescued, the electric field E cannot be uniform between the rescuer and the person being rescued because of the electric space charge present therebetween. The above equation is therefore not satisfied and is merely an imperfect indication of the potential difference between the helicopter and the ground. As the rescuer approaches the person to be rescued, the disturbances to the electric field have a natural tendency to be reduced.

Further, it may be observed that the sensitivity of the electric field magnitude as a representation of the potential tends to increase as the rescuer approaches the person to be rescued since $1/d$ is increasing.

As a result, as the rescuer comes closer to the person being rescued the use of the electric field as the magnitude proportional to the potential difference in the measuring loop becomes more and more convenient (since the sensitivity is increasing) and more and more accurate (since the condition of proportionality becomes closer and closer to the truth).

Various implementations of the sensor 20 are now described.

Figure 3:
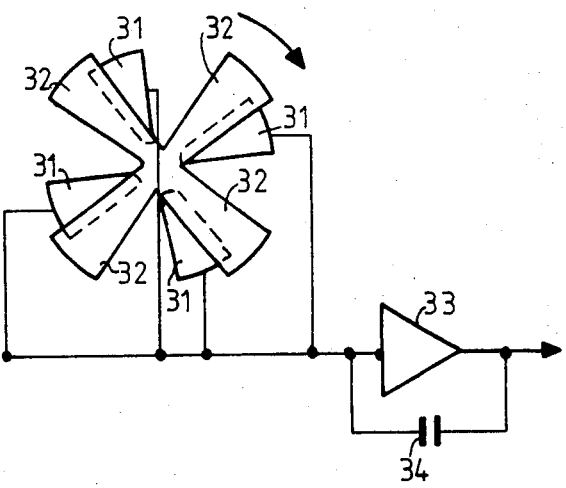
FIGS. 3 to 7 are diagrams of different electric field sensors.

FIG. 3 shows an electric field sensor of the "windmill" type. The windmill sensor includes a fixed measuring electrode 31 and a moving or screen electrode 32 which periodically masks and unmasks portions of the measuring electrode relative to the zone in which an electric field is to be detected. The measuring electrode 31 is connected to an electric charge amplifier or integrator, represented by an operational amplifier 33 having a parallel-connected capacitor 34. The magnitude of the output from the amplifier is proportional to the potential difference to be measured, i.e. in this case to the potential difference between the helicopter and the ground as determined by the electric field in the vicinity of the rescuer.

In FIG. 3, the windmill is shown diagrammatically as four fixed electrodes 31 individually connected to the input of the amplifier 33, while the moving electrode is a Maltese cross which rotates to alternately mask and unmask the fixed electrodes 31. An improved windmill type field sensor is described in published French patent application No. 80 04 017 filed Feb. 22, 1980. The volume occupied by the windmill sensor may be less than one liter, and its mass may be less than one kilogram, thereby making it relatively easy to add to the equipment of a rescuer, or to other types of suspended load.

Figure 4:
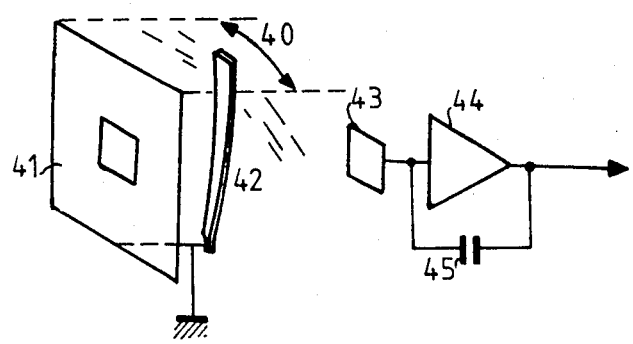

FIG. 4 shows a variant windmill type sensor which is often referred to as a vibrator type electrostatic sensor. A screen 41 has an opening in the middle. Behind the opening there is a blade 42 which vibrates from side-to-side in its own plane, as indicated by arrow 40. A sensor electrode 43 is connected to the input of an operational amplifier 44 connected as an integrator by means of a capacitor 45, and the sensor electrode 43 is periodically masked and unmasked relative to the opening in the screen 41 by the vibrating blade 42. Such a device is a little less sensitive than the FIG. 3 windmill, since its electrode area is smaller, but it has the advantage of occupying less volume. Such a device may be incorporated in a rescuer's boot 12, or in a rescuer's glove 14, or on the rescuer's wrist 15, or on the harness 8.

Figure 5:
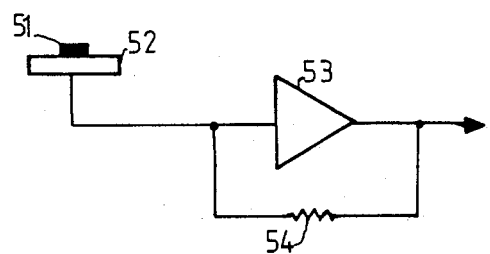

FIG. 5 shows the principle of another sensor which is based on a radioactive pellet 51 supported on a measuring electrode 52 which is connected to the input of a current amplifier shown diagrammatically as an operational amplifier 53 having a feedback resistance 54. The measured current is directly proportional to the surface field. Account must be taken of this in the servo-control loop, to ensure that the loop responds to potential.

This type of sensor has the advantage of being very simple. However, it suffers from several drawbacks such as a slow response, since it is saturates at fields of more than a few kilovolts per meter and the fields to be measured are generally stronger. Further, its operation may be disturbed by anything being deposited on the surface of the radioactive pellet, e.g. spray, sand, etc.

In order to perform the present invention, such a detector can only be used by reducing the surface field by means of electrostatic screens in order to avoid saturation, and also to protect it from any kind of deposit being made on its surface. Under such conditions, it occupies a volume which is comparable to the sensor described above with reference to FIG. 4.

Figure 6:
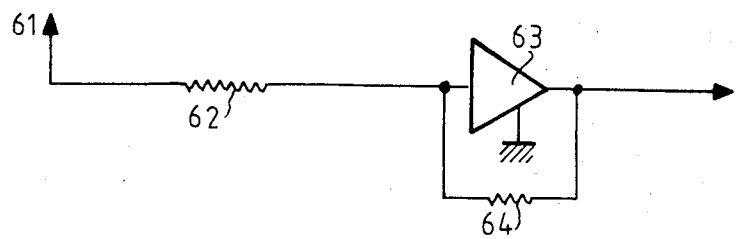
Figure 7:
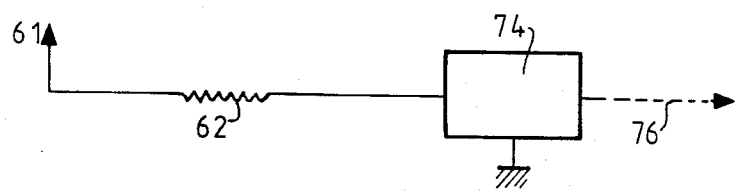

FIGS. 6 and 7 show two variants of a fourth version of an electric field detector.

In FIG. 6, a metal point 61 is constituted by the end of a rod having a diameter of a few tenths of a millimeter. This point is connected in series with a resistance 62 of several tens of megohms. The current thus obtained is substantially proportional to the ambient electric field, and thus to the looked-for potential difference (taking account of the distance). This current may be used by a current amplifier 63 having a feedback resistance 64 as shown in FIG. 6.

The FIG. 7 variant replaces the current amplifier by a unit 74 which may be an electro-optical converter or a pulse digitizer, and which may serve as the starting point for various kinds of link 76, including a fiber optic link.

The pulse digitizer may be of known type. An electro-optical converter is shown diagrammatically in FIG. 8. The output from the resistance 62 is applied to two circuits connected in series, each comprising a capacitor 741, 751 connected in parallel with a respective neon tube 743, 753. The two circuits also include reverse-connected diodes 742 and 752 respectively. Each circuit is thus associated with a respective one of the possible directions of current flow to be measured. Each of the neon tubes 743 and 753 is connected to an optical fiber F, with the fibers constituting the link 76 which thus constitutes an optical fiber version of the link 23 shown in FIG. 2.

Pulse transmission devices of this kind are described in published French patent application No. 77 11 762 filed Apr. 19, 1977.

Such a corona or point-discharge device may be very light (less than 100 grams) and may occupy a volume of 100 cm$^3$. Naturally, several metal points could be used, or instead of using metal points, points based on conductive fibers such as carbon fibers could be used which may be molded in resin to form a stick of composite material. It would also be possible to use a bundle of threads made of a polymer or of a rubber having high resistivity.

Naturally, a combination of the above means may be used in order to increase operational safety of the measuring device by using redundancy of unlike means.

The signal obtained by using sensors of the above type is proportional to the magnitude to be eliminated. The servo-control chain mentioned with reference to FIG. 2 consequently controls the action of an active static discharger to vary the potential of the helicopter-cable-rescuer combination.

Such active static dischargers are described in the literature. They comprise an ejector for positive or negative electric charges based either on two units each of which operates with one polarity of charge only, or else on a single unit capable of emitting positive or negative charges selectively.

A first version of an active static discharger uses ions as charge carriers which are emitted from a corona point maintained at a potential of several hundreds of positive or negative kilovolts.

In a second version, the charge carriers are aerosols of water or ice emitted by a supersonic jet of wet air. The emission nozzle includes a metal point at its throat which is axially disposed and raised to a tension of 5 to 10 kilovolts. Such a device is capable of emitting a current of about 100 microamps either positive or negative. Such a device is described in published French patent application No. 78 07 167 filed Mar. 10, 1978. Similar devices are described in an article by S. LARIGALDIE, and N. FELICI entitled "Experimental study of a static discharger for aircraft with special reference to helicopters": Journal of Electrostatics, 9, 1980, 59–70.

To eliminate the helicopter-ground potential difference, the current emitted by the active discharger is varied by the servo-control until the signal provided by the electric field sensor is reduced to zero. Such an operation can be performed automatically by servo-control of the type described. It has already been mentioned that the electric field is particularly suitable for satisfactory performance of this servo-control system since the input magnitude increases and since it is increasingly proportional to the potential to be eliminated as the rescuer moves closer to the person to be rescued.

The static discharger could be located on the rescuer. However, the applicant currently considers that it is preferable for the discharger to be placed on board the helicopter, for various practical reasons.

The transmission link between the rescuer and the helicopter may then be either:

a radio link as mentioned above, or an optical link using optical fibers which may be housed in the core of the winch cable; or an electrical link passing via the winch cable itself, provided the winch on which it is wound is isolated from the helicopter chassis.

This arrangement is particularly favorable when a corona discharge sensor is used, but it may also be applied when high frequency transmission is used or when pulses are transmitted analogous to the pulses produced by neon tube discharges as described in published French patent application No. 77 11 762 filed Apr. 19, 1977.

In a particular embodiment, the corona current charges a capacitor which discharges through a neon tube once the potential across the capacitor terminals reaches a characteristic value, i.e. in the manner of a relaxation oscillator. The resulting pulse may be used optically by means of an optical fiber or electrically by means of a conductive link. The distinction between positive and negative currents is immediate for an electrical link since the sign of the pulses depends thereon.

Figure 8:
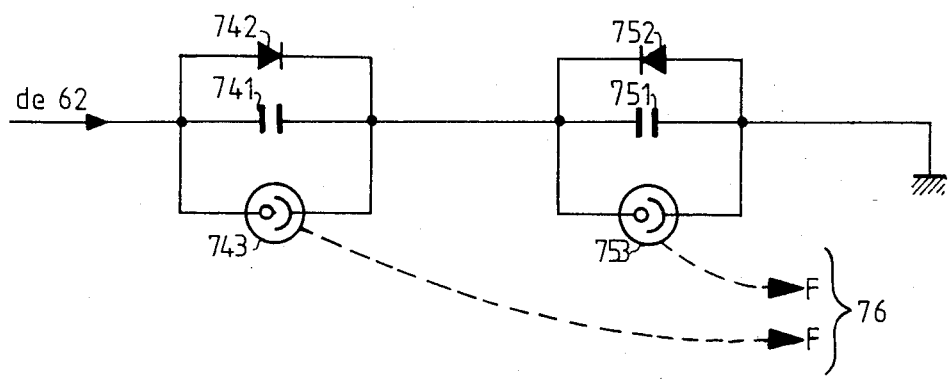
FIG. 8 shows a detail of the FIG. 7 sensor.

If, as illustrated in FIG. 8, it is desired to use the light emitted by the neon tube, it becomes necessary to use a two-capacitor circuit with the capacitors connected in series and short circuited by respective oppositely-directed diodes so that only one of the relaxation oscillators operates for each polarity.

When the static charge is discharged directly by the rescuer, the active discharger is placed in the immediate vicinity of the bottom end of the cable, and it is pointed away from the direction in which the electric field is detected so as to avoid disturbing the measurement of the field, and also it is pointed as far as possible downwardly so as to increase the efficiency of charge ejection since the charges are then being directed towards the reference potential.

In a particular implementation of the invention, the rescuer is provided with conductive clothing, i.e. the warp threads thereof include a metal filament along certain vertically directed current lines, and good contact is ensured with the boots 12. The conductive filaments have a resistance which is preferably less than one megohm. The heel of one of the boots 12 includes an electric field sensor of the vibrating electrode type (FIG. 4). An electrical connection mounted in the clothing connects the electric field sensor to a radio transmitter 22 in the pocket 13. The radio link terminals at 24 onboard the helicopter and serves to control an active static discharger 26 which is of the type described in the above-mentioned published French patent application No. 78 07 067.

It has been observed that the performance of a windmill type sensor, or of a similar vibrator type sensor, is limited over very short distances by contact potential differences of about one volt. As the distance between the rescuer and the persons being rescued decreases, the accuracy of the field measurement is limited, prior to contact, by an uncertainty of about one volt. This potential difference is negligible relative to the tens or hundreds of kilovolts observed in the absence of any protection. It appears that the present invention provides an entirely effective solution to the problem.

Except when referring specifically to the electrical "ground" of the helicopter, references to "ground" or to the "ground surface" in this specification are references to the land, water, or man-made structure over which a helicopter may be flying.

I claim:

1. A method of securely lifting a load by eliminating the electrostatic potential of a helicopter relative to ground during lifting operations performed by the helicopter comprising the steps of:
   (a) suspending a load at the end of a conductive cable wound on a winch installed on board the helicopter, said cable being electrically connected to the electrical ground of the helicopter;
   (b) lowering said load towards the ground surface;
   (c) measuring at said load an electrical field in a direction oriented downwards;
   (d) transmitting said electrical field measurement to an active static discharger, located on board the helicopter; and
   (e) servocontrolling said active static discharger, using said electrical field measurement, so as to minimize the difference of potential between said load and the ground.

2. A method according to claim 1, wherein the load is a man, e.g. a rescuer, suspended by a harness at the end of the cable and seeking to lift a person to be rescued by means of a second harness also suspended from the end of the cable.

3. An apparatus for securely lifting a load by eliminating the electrostatic potential of a helicopter relative to ground during lifting operations performed by the helicopter, comprising:
   (a) a conductive cable wound on a winch installed on board the helicopter and electrically connected to the electrical ground of the helicopter, said cable supporting a load to be lowered towards the ground surface;
   (b) an electric field sensor pointed towards the ground surface located at said load for measuring at said load the electrical field in a direction oriented downward;
   (c) an active static discharger provided to discharge the helicopter-cable-load combination;
   (d) means for transmitting said electrical field measurement to said active static discharger; and
   (e) servo-control means for servo-controlling the discharge of said static discharger as a function of the detected electric field in such a direction as to tend to reduce said field, thereby substantially eliminating the potential difference between the load and the ground surface as they move closer to each other.

4. Apparatus according to claim 3, wherein the electric field sensor is a miniaturized "windmill" type sensor.

5. An apparatus according to claim 3, wherein the active static discharger is provided on board the helicopter and wherein a transmission link is provided to transmit said electrical field measurement from the load to the helicopter.

6. An apparatus according to claim 3, wherein the active static discharger is provided at the load, and is pointed towards the ground surface but away from the point aimed at thereon.

7. An apparatus according to claim 3, wherein the load is man, such as a rescuer, suspended by a harness at the end of the cable and seeking to lift a person to be rescued by means of a second harness likewise suspended from the cable.

8. An apparatus according to claim 3, wherein the electric field sensor is an electrostatic vibrator type sensor.

9. An apparatus according to claim 3, wherein the electric field sensor is a radioactive source electrostatic field sensor.

10. An apparatus according to claim 3, wherein the electric field sensor is a corona discharge electric field sensor associated with means for detecting the corona current.

11. An apparatus according to claim 10, wherein said corona discharge electric field sensor comprises a spike.

12. An apparatus according to claim 5, wherein said transmission link uses radio waves.

13. An apparatus according to claim 5, wherein said transmission link uses optical fibers.

14. An apparatus for eliminating the electrostatic potential of a helicopter relative to ground during lifting operations performed by the helicopter, comprising:
(a) a conductive cable wound on a winch installed on board the helicopter and electrically connected to the electrical ground of the helicopter, said cable supporting a person such as a rescuer, said person is suspended by a harness at the end of the cable and seeking to lift a person to be rescued by means of a second harness likewise suspended from the cable, said rescuer to be lowered towards the ground surface;
(b) an electric field sensor pointed towards the ground surface located at said rescuer said rescuer wearing clothing having conductive warp threads connected in series between the cable and the electrical ground of the electric field sensor;
(c) an active static discharger provided to discharge the helicopter-cable-load combination;
(d) servo-control means for servo-controlling the discharge of said static discharger as a function of the detected electric field in such a direction as to tend to reduce said field, thereby substantially eliminating the potential difference between the load and the ground surface as they move closer to each other.

15. An apparatus according to claim 14, wherein the rescuer is wearing the electric field sensor externally.

* * * * *